Figure 1:
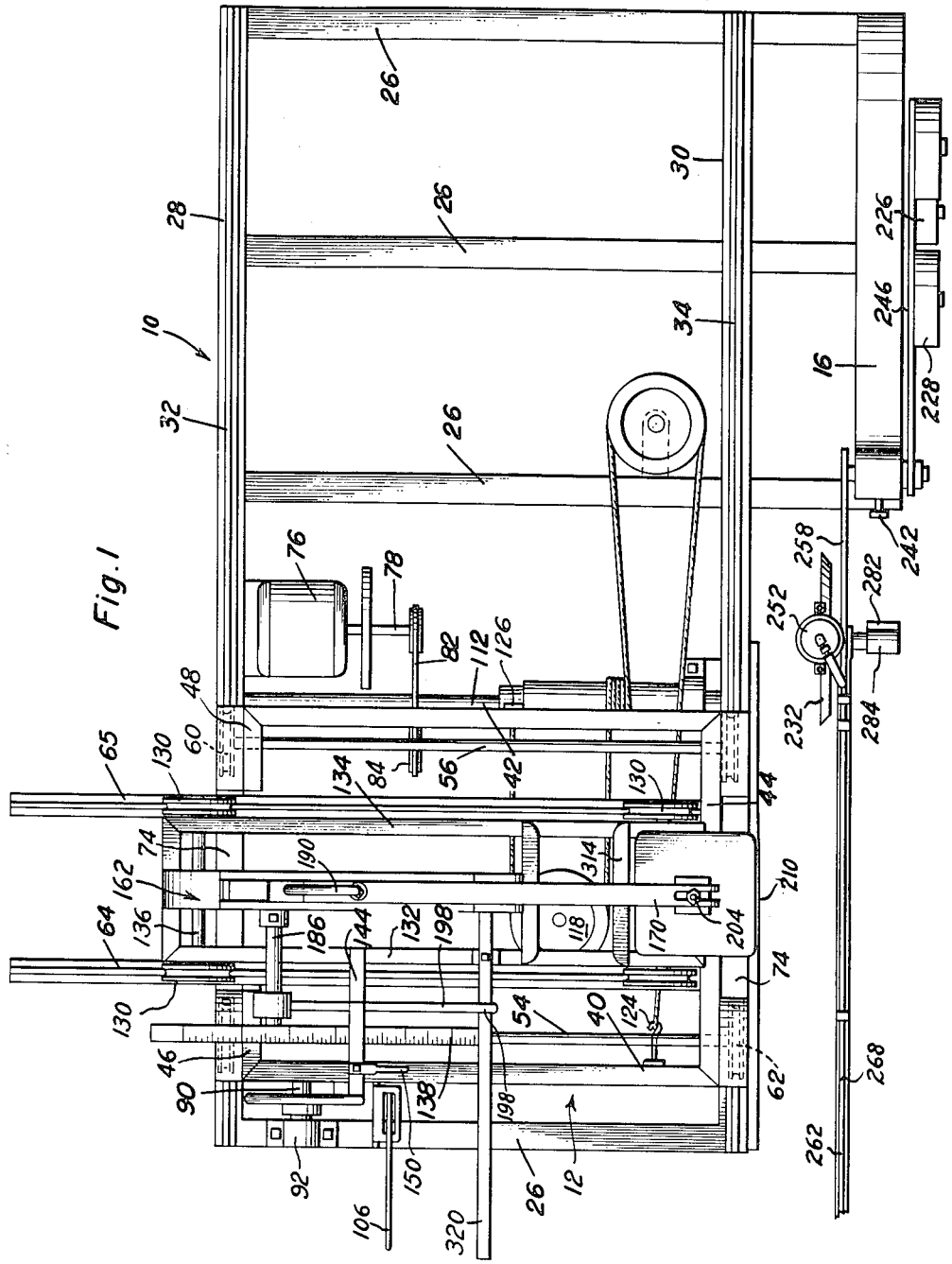

July 24, 1956

V. B. GRAHAM 2,755,790

STONE CUTTING MACHINE

Filed June 16, 1954

6 Sheets-Sheet 2

Von B. Graham
INVENTOR.

BY
*Attorneys*

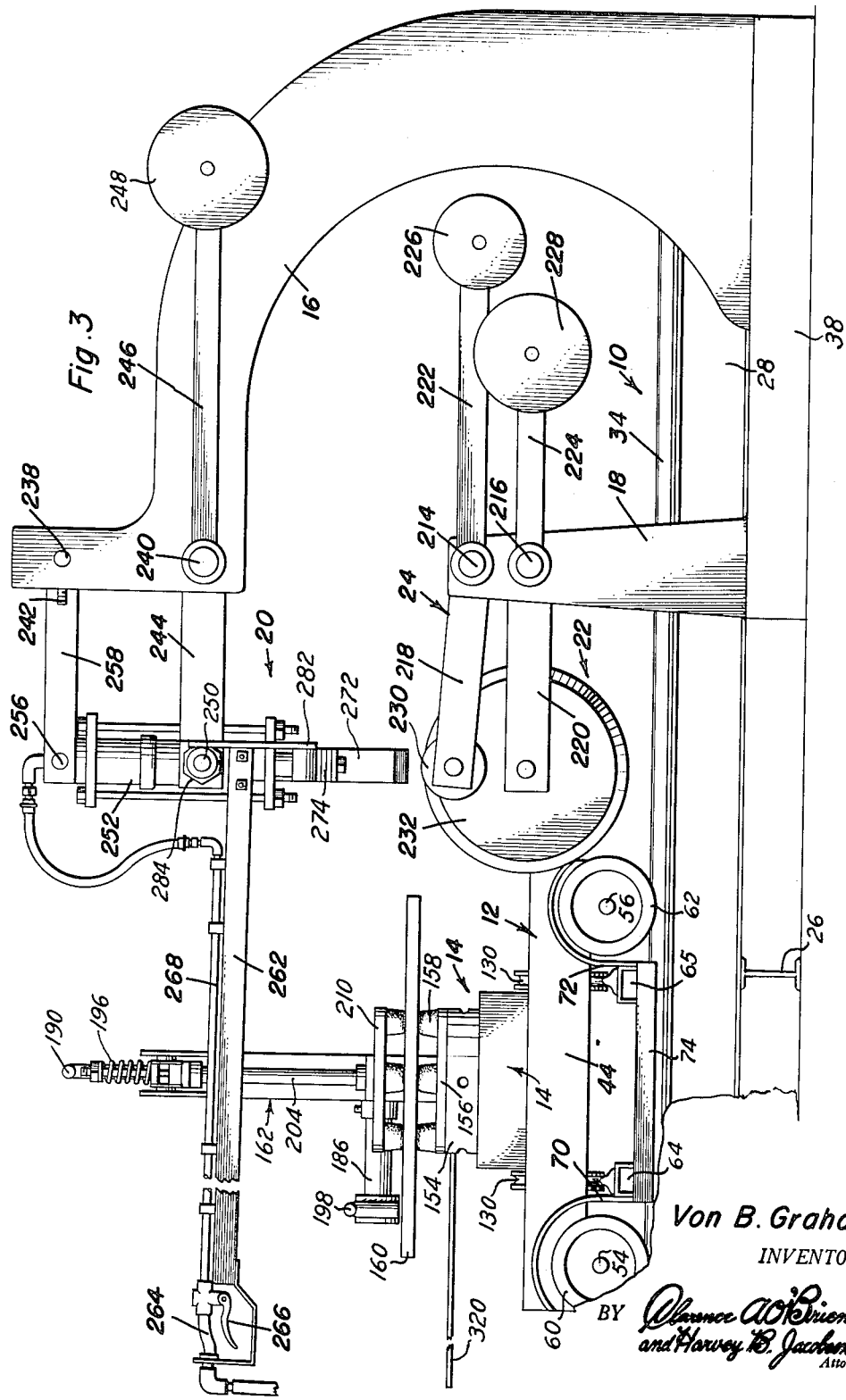

July 24, 1956
V. B. GRAHAM
2,755,790
STONE CUTTING MACHINE
Filed June 16, 1954
6 Sheets-Sheet 4
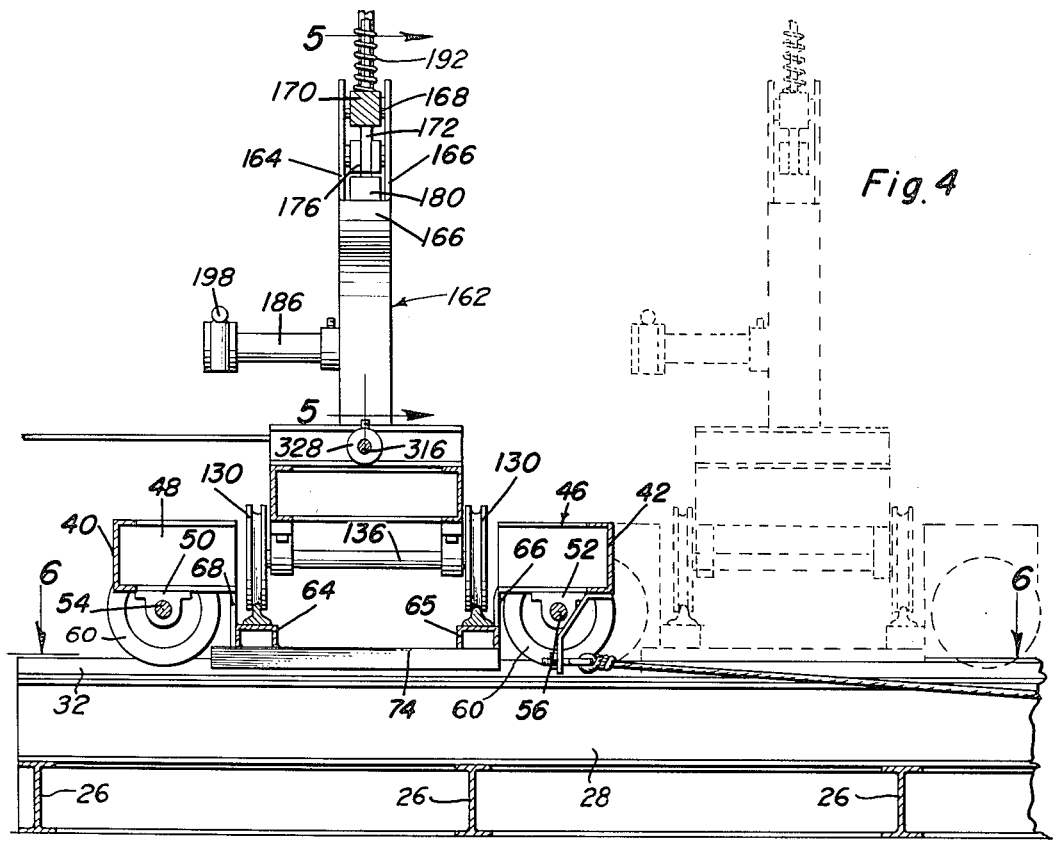
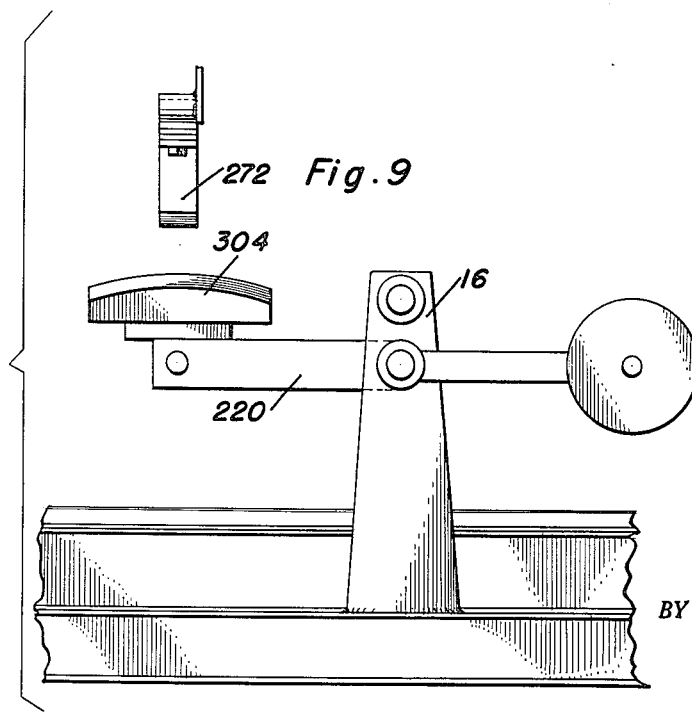
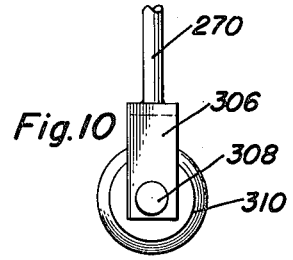
Von B. Graham
INVENTOR.

July 24, 1956  V. B. GRAHAM  2,755,790
STONE CUTTING MACHINE
Filed June 16, 1954  6 Sheets-Sheet 5
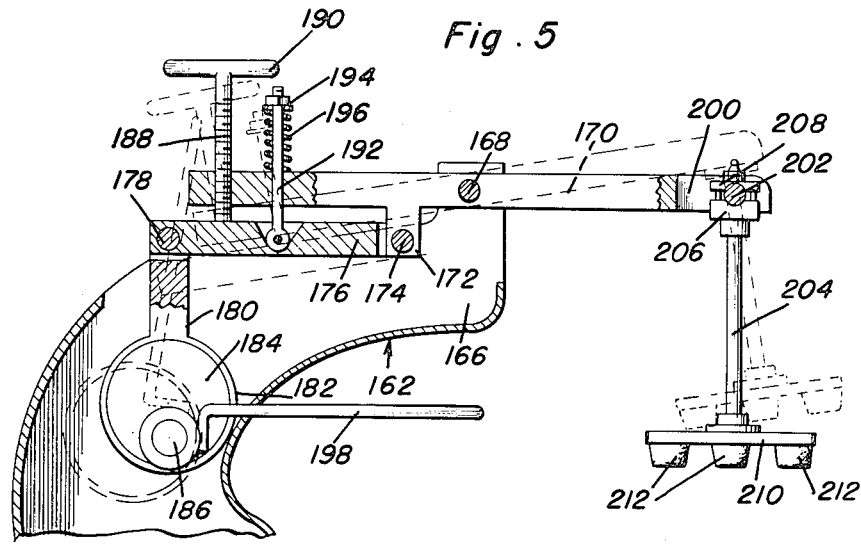
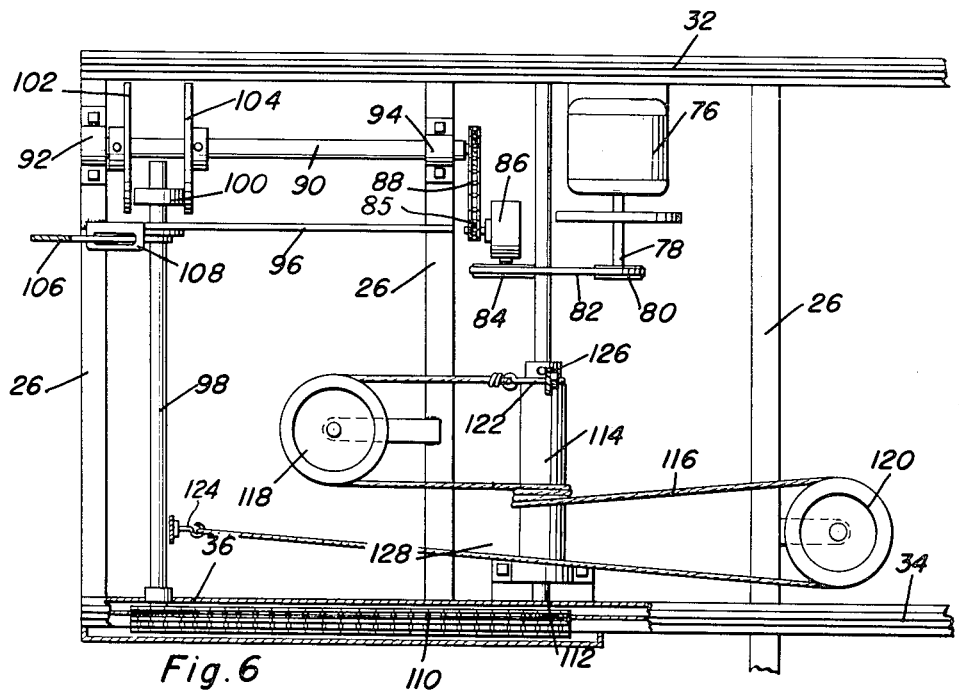
Von B. Graham
INVENTOR.

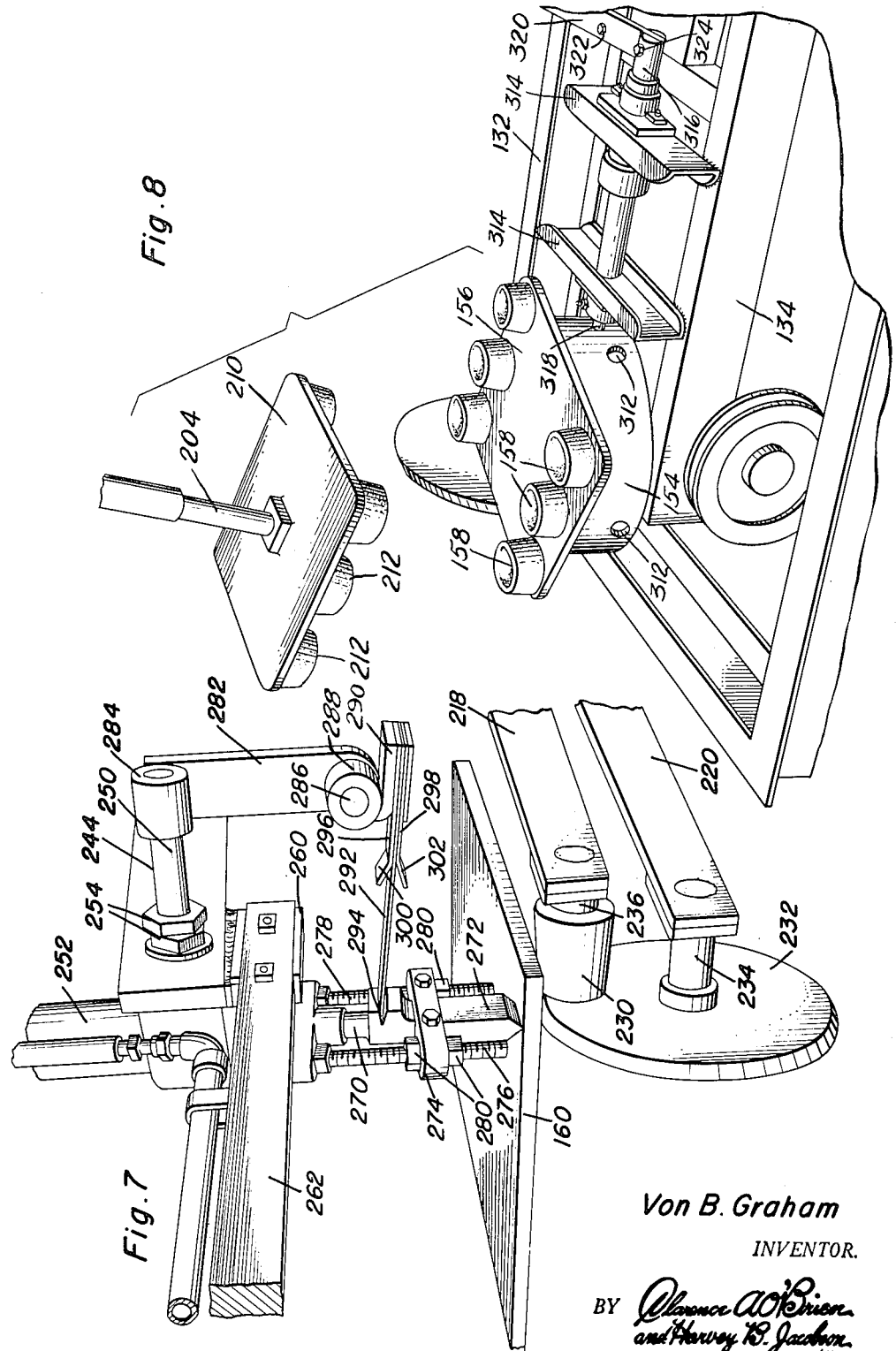

United States Patent Office 2,755,790
Patented July 24, 1956

2,755,790
STONE CUTTING MACHINE
Von B. Graham, Clarksville, Ark.
Application June 16, 1954, Serial No. 437,036
6 Claims. (Cl. 125—23)

This invention relates to cutting machines and has for its primary object the provision of an improved stone cutting mechanism.

Another object of this invention is to provide an improved stone cutting machine which utilizes a pair of vertically aligned cutting elements for bearing against opposite sides of a stone slab to be cut and a breaker element disposed adjacent the cutting element and adapted to exert a deflecting or breaking force to the free edge of the stone slab being cut whereby an improved, accurate and rapid cutting operation may be performed.

Still another object of this invention is to provide a stone cutting machine in conformity with the foregoing object wherein the cutting elements are mounted for movement in a vertical plane and wherein one of the cutter elements is movable under control of the operator and incorporates a reciprocating cutter blade also conveniently under control of the operator.

A further object of this invention is to provide an improved stone cutting machine which incorporates a base assembly movably mounted along a pair of tracks and a bed or truck assembly removably mounted on the base transversely of the track and cutter element in conformity with the foregoing object fixedly mounted adjacent to and at one side of the track.

Still further, an object of this invention embodies the provision of a stone slab clamping and supporting assembly including a rotatably mounted table and means for latching the table in one of several rotated positions so as to effect the desired uniformity or angular relationship between adjacent sides of a stone slab, and wherein the assembly is at all times under control of the operator.

Still another object of this invention resides in the provision of an improved power cutter assembly for use in a stone cutting machine which embodies novel mounting and resilient support of the cutter blade.

Another object of this invention is to provide an improved stone cutting machine which incorporates a stone slab clamping assembly provided with cooperable jaw members or support plates, one of which is mounted for movement toward and away from the other by a quick acting cam mechanism so as to materially expedite the loading and unloading of the machine.

Still another object of this invention incorporates the provision of improved cutter elements for use in conjunction with a stone cutting machine, one of which at least is swingable in a vertical plane and is provided with a powered cutting element.

Figure 2:
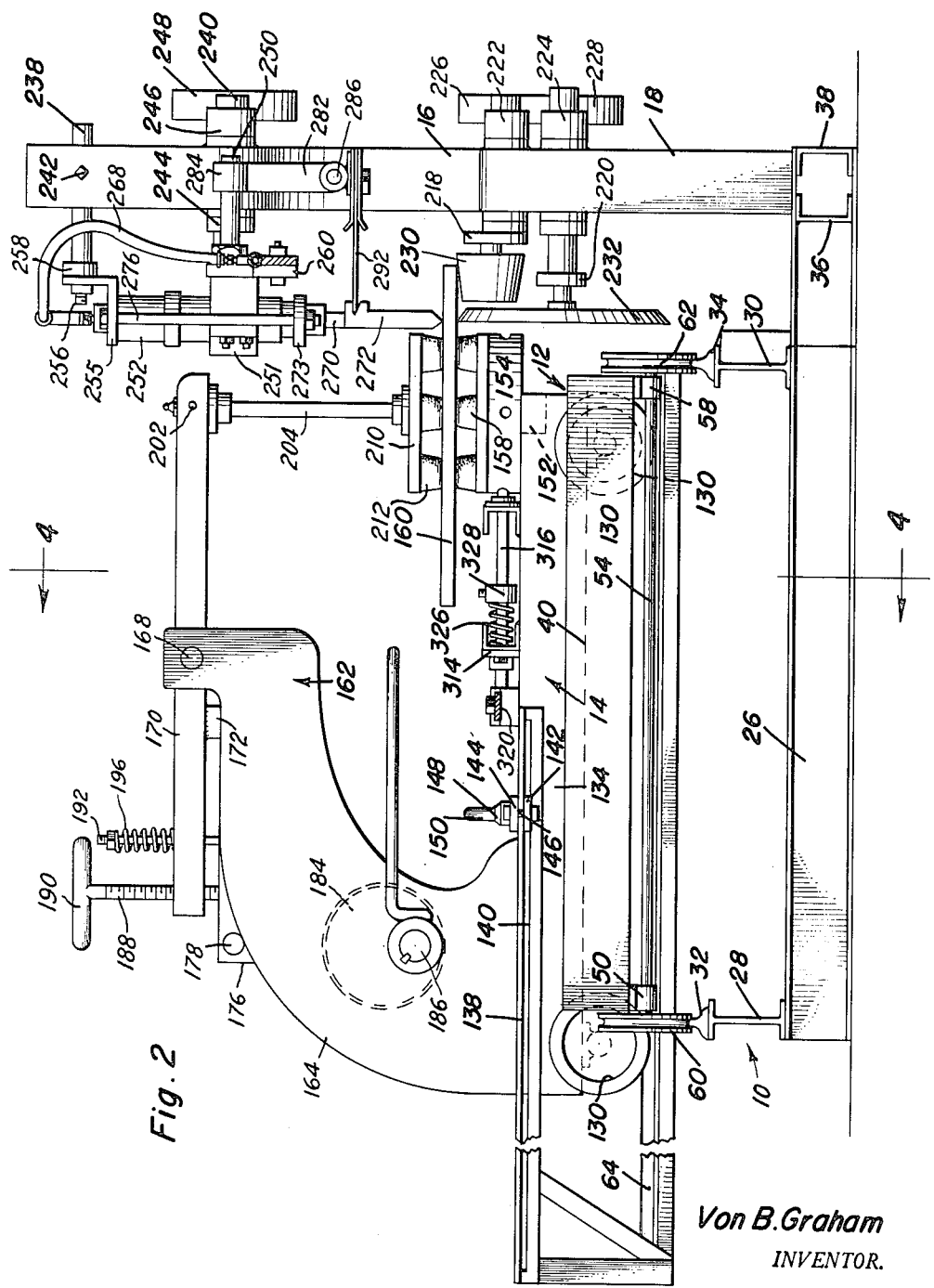

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the stone cutting machine;
Figure 2 is an end elevational view of the machine;
Figure 3 is a side elevational view of the machine;
Figure 4 is a longitudinal vertical section taken substantially along the plane of section line 4—4 in Figure 2;
Figure 5 is an enlarged vertical section taken substantially along the plane of section line 5—5 of Figure 4;
Figure 6 is a plan view of the bed driving mechanism for the machine;
Figure 7 is a perspective view of the cutting assembly;
Figure 8 is a perspective view of the clamping assembly;
Figure 9 is an elevational view of a modified form of the invention; and
Figure 10 is an elevational view of a modified form of the cutter tool.

Referring now more particularly to the drawings, it will be seen more particularly in Figure 3 that the machine incorporates a main track assembly indicated generally by the reference character 10 upon which a base assembly 12 is movably mounted to constitute a primary truck which in turn has movably mounted thereon but transversely to the track assembly 10 a bed assembly 14 constituting a secondary truck. The machine will be seen to consist further generally of support elements 16 and 18 which carry the first and second cutter assemblies 20 and 22, respectively, and the latter of which further carries a breaker or deflector assembly indicated generally by the reference character 24.

The base is provided for the machine and will be seen to consist of a plurality of spaced parallel I-beam members 26 which extend transversely of the machine and which are interconnected by a pair of upper longitudinal I-beam members 28 and 30 upon which the track elements 32 and 34 are rigidly secured. Some of the frame members 26 are further connected by channel frame members 36 and 38 at one end thereof which extend longitudinally partway of the length of the machine for rigidifying the base and for providing a support for the previously mentioned support members 16 and 18. The assembly 12 consists of a pair of spaced, parallel, vertical side frame members 40 and 42 which are interconnected at one end by the end frame member 44 and which are provided at their opposite ends with the short frame pieces 46 and 48 having bearing members 50 and 52 thereon rotatably receiving corresponding ends of the axle member 54 and 56 in a manner shown most clearly in Figure 4.

The frame member 44 carries a pair of bearing members 58 which rotatably receive the other ends of the axles 54 and 56 and it will be readily appreciated that a pair of wheels, such as those shown at 60 and 62 in Figure 2, are associated with each axle for guided engagement upon the previously mentioned track members 32 and 34.

A pair of track members 64 and 65 are rigidly secured to the assembly 12 by means of hangers 66 and 68 on the frame portions 46 and 48, respectively, and by means of hangers 70 and 72 on the frame member 44. Thus, the track members 64 and 65 are controlled below the main portion of the assembly 12 and it is to be noted that these track members extend transversely to the first mentioned track members 32 and 34 and extend laterally some distance beyond the track member 32. Further, it is to be noted that combined track cleaning and rigidifying members 74 are rigidly interconnected to the track members 64 and 65 adjacent each of the tracks 32 and 34 and overlying the same in straddling relation thereto effect the track clearing relationship. In this respect, it will be noted that the members 74 may be of inverted channel configuration.

For the purpose of illustrating the mechanism for moving the assembly 12 longitudinally along the rails or tracks 32 and 34, attention is now directed more particularly to Figure 6 of the drawings wherein it will be seen that the suitable drive mechanism such as an electric motor 76 may be rigidly connected to the machine and provided at the free end of the drive shaft 78 with a pulley 80 having a belt 82 thereon entrained about a pulley 84 provided on the free end of an input shaft of a gear reduction unit 86 also rigidly mounted to the machine. The output shaft of the gear reduction unit is provided with a sprocket 85 for cooperation with a chain 88 which effects drive to a lay shaft member 90 suitably journalled as by bearings 92 and 94 on a pair of the I-beam members 26. A bearing support plate 96 may be provided between the frame members 26 supporting the shaft 90 for supporting one end of shaft member 98 whose opposite end is journalled in the previously mentioned frame member 34 and it is to be noted that any suitable bearing is mounted in the plate 96 for supporting the shaft 98 and that such bearing is mounted in the plate 96 in such a manner as to provide a slight lateral shifting of the bearing so that the drive element 100 of the shaft 98 may selectively engage either of the friction disks 102 or 104 on shaft 90 in response to movement of the lever 106 pivoted to a suitable bracket 108 and having its lower free end embracing the shaft 98. The outer end of shaft 98 is provided with a sprocket over which a flexible chain 110 is trained for cooperation with a sprocket on drive shaft member 112. A drum or roller 114 is rigidly secured on the shaft 112 and an intermediate portion of a flexible element or cable 116 is wrapped several times about this drum and the opposite end of the flexible element issue from the drum in opposite directions to pass over the sheave 118 and 120. The opposite free ends of the flexible element 116 are dead ended on the assembly 12 as by suitable hook elements 122 and 124 carried by suitable bracket members 126 and 128 on the assembly 12. It will, of course, be appreciated that the sheaves 118 and 120 will be so positioned with respect to each other and with respect to the frame of the machine that the desired longitudinal movement of the assembly 12 is permitted thereon.

The bed assembly 14 rides on the track members 64 and 65, suitable wheels 130 being provided for this purpose and it will be noted that this assembly includes a generally rectangular main frame having the opposite side frame members 132 and 134 which may be suitably braced and interconnected at their opposite ends and intermediate portions and which carry the axle assemblies 136 carrying the wheels 130. For the purpose of positioning the assembly 14 at the desired position along the tracks 64 and 65, one of the tracks 64 carries a calibrating bar member 138 which is disposed parallel with and to one side of the frame member 134 and, as seen, this bar is of angle configuration and is provided at its vertical web with an elongated slot 140 through which a strap 142 projects, this strap being secured rigidly at one end to the frame member 132 of the assembly 14. A further strap member 144 is rigidly secured in spaced parallel relation to the strap 142 and the two are secured together at their free ends by a bolt member 146. A further bolt 148 projects through the straps 142 and 144 but on an opposite side of the bar 138 from the bolt 146 and a manually controlled locking nut member 150 is threadedly engaged on the nut 148 such that when the nut 150 is tightened, the two straps 142 and 144 will clampingly engage the bar 138 therebetween to fix the position of the assembly 14 along its tracks 64 and 65. The bar 138 may be provided with suitable calibrations to indicate its relative position.

As seen most clearly in Figures 2, 3 and 8, the main frame of the assembly 14 carries a vertical spindle member 152 upon which a table 154 of cylindrical configuration is rotatably mounted. The top of the table is provided with a plate member 156 upon which a plurality of resilient cup members 158 are rigidly attached and upon which a slab of stone 160 is adapted to be rested. Rigidly secured to the main frame of the assembly 14 is an upstanding support member 162 which, as will be seen most clearly in Figures 4 and 5, incorporates a pair of side wall members 164 and 166 between which a pivot pin 168 is secured. An arm member 170 is pivoted intermediate its ends on the pin 168 and is provided adjacent thereto with depending arm 172 carrying a pivot pin 174 to which the operating lever member 176 is pivotally secured. The opposite end of this member 176 is pinned as at 178 to the connecting rod member 180 whose lower end 182 embraces an eccentric 184 mounted on the shaft 186 which is journalled between the side plate members 164 and 166. An adjusting screw 188 is threadedly engaged in the free end of the arm 170 and abuts against the upper surface of the link member 176 and is provided with a hand wheel member 190 at its upper end. A pressure rod 192 is pivotally connected to the link 176 and projects upwardly therefrom through a suitable aperture in the arm 170 and is provided at its upper free end with a nut member 194 engaging against the upper end of a spring member 196 disposed in surrounding relation to the rod 192 and whose lower end abuts the upper surface of the arm 170. The rod and spring are provided for effecting pressure between the link 176 and the arm 170 to pivot the same together and hold the adjustment of the screw 188 as will be readily apparent. The shaft 186 is provided with a hand actuated lever extension 198 upon manipulation thereof the eccentric and consequently the connecting rod 180, link 176 and arm 170 will move between the dotted and full line positions as shown in Figure 5. The free end of the arm 170 is bifurcated as at 200 and carries a transverse pivot pin 202 therebetween.

A pressure rod 204 carries a bearing block 206 at its upper end which in turn carries a further bearing block 208 such as to sandwich the pivot pin 202 therebetween and effect a pivotal connection between the pressure rod 204 and the arm 170. Rotatably carried on the lower end of the rod 204 is a pressure plate 210 having resilient, cup-shaped clamping elements 212 thereon which cooperate with the previously mentioned members 158 to clamp the stone slab 160 therebetween.

The previously mentioned support 18 has a pair of shaft 214 and 216 projecting therethrough and at one end of each shaft horizontal arm members 218 and 220 are rigidly secured and extend therefrom in parallel relation to the tracks 32 and 34. The opposite ends of the shafts 214 and 216 are provided with further arm members 222 and 224 which extend oppositely therefrom relative to the arm members 218 and 220 and which are provided at their free ends with counterweight members 226 and 228. The free ends of the arms 218 and 220 are respectively provided with a roller breaker or deflector member 230 and the cutter disk 232. Since the shafts 214 and 216 are free to turn in the support 18, it will be appreciated that the weight of the counterweight assemblies 226 and 228 are normally such as to lower the arms 222 and 224 and thus elevate the arms 218 and 220. Then, as will be seen most clearly in Figure 7, the arm member 218 will move the cutter disk 232 upwardly against the undersurface of the stone slab 160 and the arm member 220 will also move the deflector 230 upwardly against the undersurface of this slab. It is to be noted that the disk 232 is rotatably mounted on a shaft 234 carried by the free end of the arm 220 and that the deflector or breaker 230 is rotatably mounted on a shaft 236 on the free end of the arm 218. It will be further noted as will be more readily apparent from a study of Figure 2, that the deflector or breaker 230 is tapered such that its point of contact with the stone slab 160 will be at the free edge thereof or at a point most remote from the contact point of the disk 232 with the undersurface of the slab.

Support 16 is provided with a pair of pivot shafts 238 and 240, the former of which is rigidly connected thereto as by a set screw member 242 and the latter of which is freely rotatable on the support. The shaft 240 carries the oppositely extending horizontal arms 244 and 246 and the free end of the arm portion 246 is provided with a counterweight member 248. The free end of arm portion 244 pivotally receives a shaft member 250 with an upright pneumatic cylinder member 252 of an air hammer retainer in position thereon as by a clamping yoke 251 and the lock nut member 254 on the shaft member 250 and it will be noted that the upper end of the cylinder 252 carries a further pivot pin 256 in a bracket 255 fixed on said cylinder. The parallelogram link 258 is pivotally received on the shaft 238 and fixed on the pin 256 so that upon vertical swinging motion of the arms 244 and 246, the cylinder 252 will remain in vertical position.

The arm 244 is also provided at its free end with a block member 260 bridged therewith to which a control arm 262 is connected and which extends therefrom within reach of an operator of the machine so that he may manually grab a hand grip 264 mounted thereon and manipulate a control valve member 226 controlling the admission of fluid such as air through the inlet line 268 to the pneumatic cylinder 252 in a manner which will be readily apparent. The cylinder or air hammer 252 has a piston member associated therewith to which a piston rod 270 is connected which issues from the lower end of the cylinder and is provided thereat with a chisel member 272 coplanar with the cutter disk 232. The chisel 272 is guided through a plate member 274 adjustably supported and positioned on the vertical threaded guide rods 276 and 278 by means of the lock nut member 280, the guide rods 276, 278 being fastened by nuts 273 to the bracket 255 and a lower bracket 273 on the cylinder. The previously mentioned shaft 250 rigid with the cylinder 252 carries a return spring arm 282 thereon by virtue of the fact that the arm is provided at its upper end with a sleeve 284 embracing the shaft 250 and it will be noted that the lower end of the member 282 is provided with a laterally projecting shaft 286 upon which receives a sleeve 288 for oscillation thereabout. A support arm 290 is rigidly secured to the sleeve 288 and a spring leaf 292 is carried thereby for projection therefrom to be received at its free end in a slot or notch 294 in the chisel 272. Stiffener spring leaves 296 and 298 are carried on opposite sides of the leaf 292 and are provided with angulated free end portions 300 and 302 to effect a progressive springing rate as the chisel 272 is moved under action of the piston rod cylinder 270 from an equilibrium position which is shown in Figure 7.

Referring now more particularly to Figure 9, it will be appreciated that the previously mentioned disk 232 may be desirably replaced under some circumstances with an arcuated chisel member 304.

In Figure 10, the modified form of chisel assembly is shown which will be seen to consist of a bifurcated support arm portion 306 carrying a pivot pin 308 upon which a chisel disk 310 is journalled. This particular type of chisel is extremely desirable under those circumstances in which the surface of the stone slab is extremely rough.

The exact construction of the pneumatic cylinder 252 and its associated mechanism, that is details of its particular valving, is of no particular moment. Suffice it to say that the pneumatic cylinder 252 is capable of vibrating the chisel 272 vertically into and from striking engagement with the top surface of the stone slab 160 such that, in cooperation with the cutting disk 232, the stone slab will be evenly and accurately cut along the desired line. The deflector or breaker 230 will of course induce an upward force on the portion of the stone slab to be cut away and will further aid in the cutting operation.

When the cut has been completed along one side of the stone slab, the supporting table 154 previously described is rotated to an angle of 90° for the second cut to form a rectangular slab. In this respect, it will be noted that the table is provided with a plurality of apertures 312 spaced exactly 90° apart and that the frame members 132 and 134 carry two suitable bearing plates 314, a latch shaft 316 slidably thereof whose free end 318 is selectively projectable into one of the apertures 312 for holding the table in the desired angular or rotated position. A control arm 320 is pivoted as at 322 to the main frame of the assembly 14 and is pivotally connected as at 324 at its free end to a corresponding free end of the shaft 316 such that operation of the lever 320 will selectively project the end 318 into or out of one of the apertures 312. For convenience, a return spring 326 is interposed between a collar 328 on the shaft 316 and one of the plates 314 such as to normally urge the shaft 316 into engagement with one of the apertures 312.

Referring in detail to the operation of the machine, in the starting position of the machine, the base assembly 12 is preferably positioned at the left end of the base, or track assembly 10, as shown in the drawings, to travel toward and past the cutter disk 232 and the chisel 272 at one side thereof. To so position the base assembly 12, the lever 106 is operated in one direction by an operator to engage the drive element 100 with the disk 104 whereby (see Figure 6) the described drive mechanism for said assembly 12 will cause the drum 114 to rotate in one direction, i. e. clockwise as viewed in Figure 6, to wind and unwind cable 116 so that one end thereof will pull said assembly 12 into the described starting position.

To cause the base assembly 12 to travel forwardly from the starting position, the lever 106 is moved in the opposite direction to engage the drive element 100 with the disk 102, whereupon said drive mechanism will cause the drum to rotate counterclockwise, as viewed in Figure 6, and wind and unwind the cable 116 so that its other end will pull said assembly 12 forwardly. In the starting position of the base assembly 12, the lever 106 may be operated to move the drive element 100 into a neutral position clear of both disks 102, 104 so that the base assembly 12 is stationary for loading a slab 160 of stone into the machine.

The slab 160 of stone is loaded by placing it, in centered position, on the cup members 158 of the table 154 of the bed assembly 14 and clamping the slab 116 in position by lowering the clamping elements 212 of the pressure, or clamping plate 210 into clamping engagement with the top face of the slab 160. This is accomplished by operating the hand lever extension 198, as viewed in Figure 5, downwardly to rotate the eccentric 184 clockwise, as viewed in Figure 5, from the dotted to the full line position shown therein, thereby causing the eccentric to pivot the link 176 so as to pivot the arm 170 and move the pressure plate 210 downwardly. Obviously, reverse operation of the hand lever extension 198 will result in the slab 160 being unclamped.

If desired, before clamping of the slab 160 in position, it may be oriented into a desired position by retracting the latch shaft 316 through operation of the control arm 320, rotating said table and latching it in rotated position by means of said latch shaft 316.

With the slab 360 loaded and clamped, as described, the bed assembly 14 is moved on the base assembly 12 transversely of the cutter disk 232 and the chisel 272 for cutting off a predetermined amount of one edge thereof. This is accomplished by the operator grasping the strap member 144 and pushing the bed assembly 14 forwardly until said strap member 144 registers with the calibration on the bar 138 to indicate the desired degree of forward movement of the bed assembly 14, after which the straps 142 and 144 are clamped to the bar 138 by the nut 150 in the manner previously described to lock the bed assembly 14 in forwardly moved, set position.

With the bed assembly 14 moved into the described set position on the base assembly 12 and the slab 160 clamped on the table 154 as described, the slab 160 overhangs the adjacent end of the base assembly 12 for cutting by the cutter disk 132 and chisel 272 and the base assembly 12, under control of lever 106, may then be operated to cause the drive for the base assembly 12 to move said assembly together with the bed assembly 14 and slab 160 forwardly to cause the slab 160 to travel past the cutter disk 232 and chisel 272 under the latter for engagement therewith. Any suitable means may be utilized for pivoting the arms 218, 220 downwardly to lower the cutter disk 232 and the deflector 230 so that the slab 160 will override the same, for instance this may be accomplished manually.

As the slab 160 reaches the cutter disk 232 it tends to depress the same so that said disk under the influence of the counter-weight member 228 rolls with upward pressure against the bottom face of the slab 160 to cut upwardly therein along a line parallel with the path of travel of the slab 160. At the same time, the slab 160 tends to depress the deflector 230 downwardly so that it, under the influence of the counterweight member 228, rolls along and bears upwardly against the bottom face of the slab 160.

As the slab 160 moves up to the chisel 272, the operator, by means of the control arm 262, lowers the cylinder 252 in opposition to the counterweight member 248 which normally maintains said cylinder and the chisel 272 raised above the path of travel of the slab 160 sufficiently for the slab to travel under the chisel. When the chisel 252 has been lowered sufficiently for the chisel 272 to operate against the top face of the slab 160, the control valve member 266 is operated to render the air hammer, which the cylinder forms a part, operative to vertically vibrate the chisel 272 continuously to cut downwardly in the slab 150 along the line of cutting of the cutter disk 232. As the slab 160 is cut, the deflector 230 exerts upward pressure against the part of the slab 160 to be cut off and tends to break that part off along the lines of the cuts made by the cutter disk 232 and the chisel 272.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a stone cutting machine, a travelling bed assembly adapted to receive and rigidly support a stone slab, a fixed support member adjacent said bed, a first cutting element carried by said support at one side of the path of travel of said bed assembly and adapted to underlie and bear against a stone slab carried by said bed, a second cutter element carried by said support in vertical alignment with the first cutter element, said second cutter element comprising a vertically vibrating upright chisel adapted to engage the upper surface of a stone slab carried by said bed, pneumatic means for continuously vibrating said chisel, and means supporting said bed assembly for horizontal movement laterally of said chisel and transversely of the path of travel of said bed assembly.

2. In a stone cutting machine, a travelling bed assembly adapted to receive and rigidly support a stone slab, a fixed support member adjacent said bed, a first cutting element carried by said support at one side of the path of travel of said bed assembly and adapted to underlie and bear against a stone slab carried by said bed, a second cutter element carried by said support in vertical alignment with the first cutter element, said second cutter element comprising a vertically vibrating upright chisel adapted to engage the upper surface of a stone slab and carried by said bed, a rolling breaker element carried by said support at said side of the path of travel of the bed assembly and adjacent the first cutter element and adapted to rollably bear upwardly against a stone slab carried by said bed, said first cutter element being disposed between said bed and breaker element, pneumatic means for continuously vibrating said chisel, and means supporting said bed assembly for horizontal movement laterally of said chisel and transversely of the path of travel of said bed assembly.

3. In a stone cutting machine, a movable bed, a pair of vertically aligned cutter elements adapted to be disposed on opposite sides of a stone slab rigidly carried by said bed, pneumatic means for continuously reciprocating one of said cutter elements, and a rolling breaker element disposed outwardly, of said bed at one side of the path of movement of said bed, from said cutter elements and adapted to roll against and bear upwardly against a stone slab carried by said bed.

4. In a stone cutting machine a track, a base movable on said track, a bed movably mounted on said base for movement transversely of said track, a fixed support disposed adjacent to and at one side of the path of movement of said base, a first cutting element carried by said support at said one side of the path of movement of said base and adapted to underlie and bear against a stone slab carried by said bed, a second cutter element carried by said support in vertical alignment with the first cutter element, said second cutter element comprising a vertically vibrating upright chisel adapted to engage the upper surface of a stone slab carried by said bed, and pneumatic means for continuously vibrating said chisel.

5. In a stone cutting machine a track, a base movable on said track, a bed movably mounted on said base for movement transversely of said track, a fixed support disposed adjacent to and at one side of the path of movement of said base, a first cutting element carried by said support at said one side of the path of movement of said base and adapted to underlie and bear against a stone slab carried by said bed, a second cutter element carried by said support in vertical alignment with the first cutter element, said second cutter element comprising a vertically vibrating upright chisel adapted to engage the upper surface of a stone slab carried by said bed, pneumatic means for continuously vibrating said chisel, a rolling breaker element carried by said support adjacent the first cutter element and adapted to roll on and bear upwardly against a stone slab carried by said bed, said first cutter element being disposed between said bed and said breaker element, and means for moving said second cutter element bodily toward and from the first cutter element.

6. In a stone cutting machine, a pair of fixed support members, a pair of shafts projecting through and journalled in one of said support members, first arm members secured to one end of said shafts and projecting laterally therefrom, second arm members secured to the opposite end of said shaft and extending oppositely from the first arm members, a cutter disk rotatably carried at the free end of one of said first arm members, a rolling breaker member carried at the free end of the other of the first arm members, a counterweight secured to the free end of each of said second arm members whereby the cutter disk and breaker member are adapted to engage under and bear upwardly against the undersurface of a stone slab, a swingable arm carried by the other support member and carrying at its opposite ends respectively a powered cutter member and a counterweight, said powered cutter member being disposed in vertical alignment with said cutter disks, and a control arm rigid with the last mentioned arm whereby the powered cutter element is selectively swingable into and out of engagement with the upper surface of a stone slab.

References Cited in the file of this patent

UNITED STATES PATENTS

| | | |
|---|---|---|
| 2,188,318 | Siderits | Jan. 30, 1940 |
| 2,319,154 | Orlow | May 11, 1943 |
| 2,364,879 | Talboys | Dec. 12, 1944 |
| 2,514,352 | Solomito | July 4, 1950 |
| 2,582,694 | Gundlach | Jan. 15, 1952 |
| 2,593,606 | Price | Apr. 22, 1952 |
| 2,679,840 | Van Loon | June 1, 1954 |

FOREIGN PATENTS

| | | |
|---|---|---|
| 48,553 | Austria | June 26, 1911 |